(12) United States Patent
Amantea

(10) Patent No.: US 6,658,176 B2
(45) Date of Patent: Dec. 2, 2003

(54) OPTICAL SWITCH USING MOVABLE MICROMECHANICAL CANTILEVERS AND EVANESCENT COUPLING

(75) Inventor: Robert Amantea, Manalapan, NJ (US)

(73) Assignee: Sarnoff Corporation, Princeton, NJ (US)

( * ) Notice: Subject to any disclaimer, the term of this patent is extended or adjusted under 35 U.S.C. 154(b) by 267 days.

(21) Appl. No.: 09/928,757

(22) Filed: Aug. 13, 2001

(65) Prior Publication Data

US 2002/0039467 A1 Apr. 4, 2002

Related U.S. Application Data

(60) Provisional application No. 60/236,667, filed on Sep. 29, 2000.

(51) Int. Cl.$^7$ ................................................ G02B 6/26
(52) U.S. Cl. ............................ 385/16; 385/15; 385/25; 385/27; 385/30; 385/31; 385/42; 385/32; 385/14; 385/48
(58) Field of Search .............................. 385/15, 16, 17, 385/18, 24, 27, 32, 39, 42, 31, 25, 14, 48

(56) References Cited

U.S. PATENT DOCUMENTS

| | | | |
|---|---|---|---|
| 4,023,887 A | 5/1977 | Speers ..................... 385/16 X |
| 4,428,017 A | 1/1984 | Vaerewyck et al. ........... 361/31 |
| 4,521,683 A | 6/1985 | Miller ..................... 73/705 X |
| 4,560,234 A | * 12/1985 | Shaw et al. ................. 385/16 |
| 4,592,043 A | * 5/1986 | Williams ..................... 398/79 |
| 4,648,686 A | 3/1987 | Segawa ..................... 385/16 X |
| 4,723,827 A | * 2/1988 | Shaw et al. ................. 385/25 |
| 4,832,466 A | 5/1989 | Nishimura et al. ......... 350/354 |
| 5,056,885 A | * 10/1991 | Chinn ......................... 385/13 |
| 5,173,956 A | 12/1992 | Hayes ......................... 385/16 |
| 5,261,015 A | 11/1993 | Glasheen ..................... 385/23 |
| 5,418,868 A | 5/1995 | Cohen et al. ................. 385/16 |
| 5,623,566 A | 4/1997 | Lee et al. ..................... 385/24 |
| 5,640,471 A | 6/1997 | Khan et al. .................. 385/17 |
| 5,784,505 A | 7/1998 | Schunk ....................... 385/17 |
| 6,097,530 A | 8/2000 | Asher et al. ................ 359/288 |
| 6,122,416 A | 9/2000 | Ooba et al. ................... 385/16 |

OTHER PUBLICATIONS

Braun et. al., "Wavelength Selective Optical Add/Drop Multiplexer . . . " U.S. Pub. No. U.S. 2002/0039470A1, published Apr. 4, 2002.*
Amantea, "Optical Switch Using Movable Micromechanical . . . ", U.S. Pub. No. U.S. 2002/0039467A1, published Apr. 4, 2002.*

\* cited by examiner

*Primary Examiner*—Brian Healy
(74) *Attorney, Agent, or Firm*—William J. Burke

(57) ABSTRACT

A micromechanical optical switch structure, that may be integrated to form an array of optical switches, switches light between a main waveguide and a switched waveguide. The switched waveguide has a coupling portion and two flexible portions and is coupled to a movable cantilever arm. The cantilever arm is configured to move at least the coupling portion of the switched waveguide between first and second positions with respect to the main waveguide. In the first position, the switched waveguide is evanescently coupled to the main waveguide and in the second position, the switched waveguide is not evanescently coupled to the main waveguide. The movable cantilever arm may be formed with bimaterial arms that move the switched waveguide in response to heat or a piezoelectric potential being applied to the arm or they may be formed with an electrostatic plate that moves the arms in response to an electrostatic potential.

19 Claims, 3 Drawing Sheets

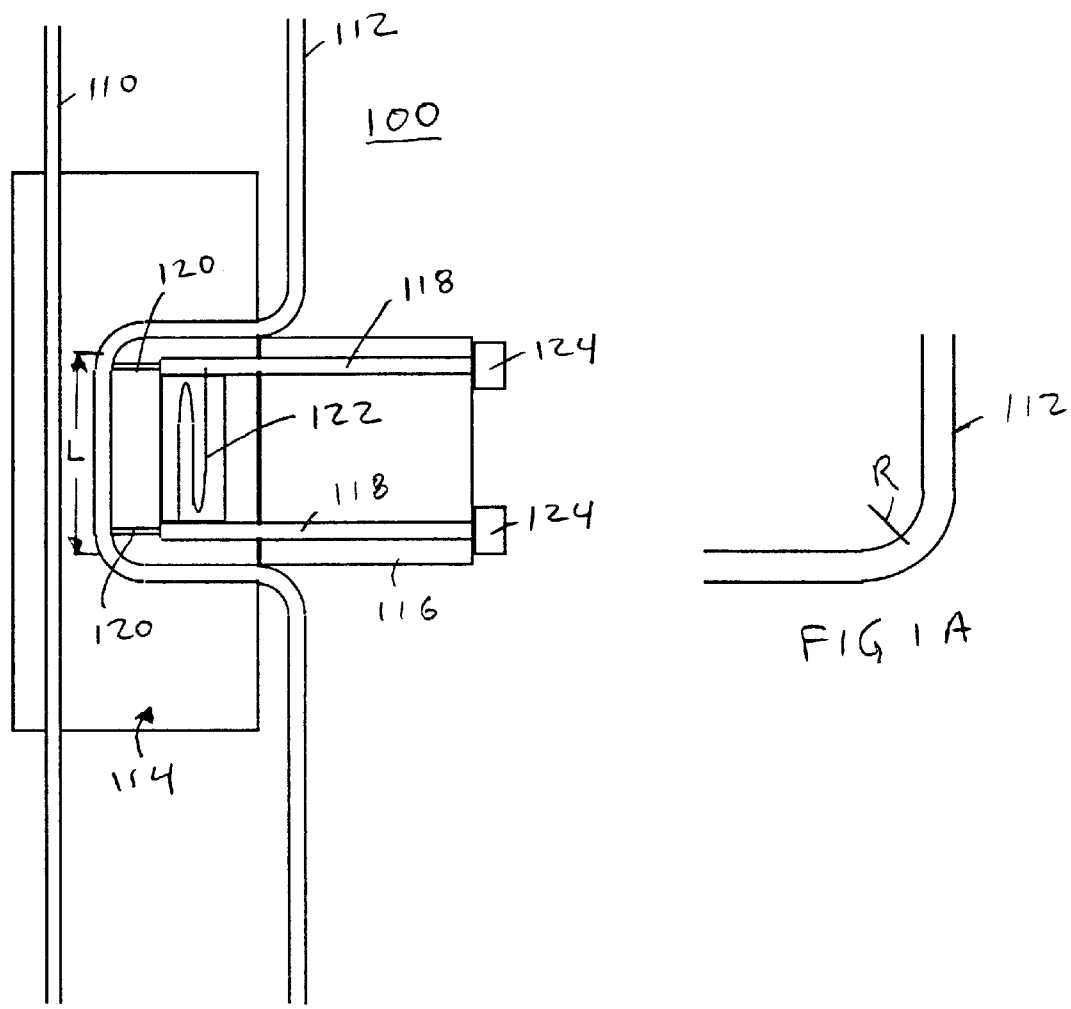
FIG 1
FIG 1A
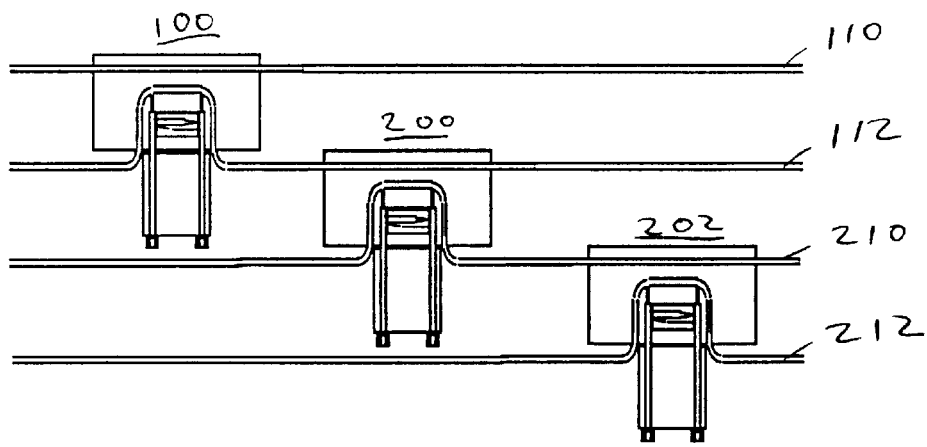
FIG 2

OPTICAL SWITCH USING MOVABLE MICROMECHANICAL CANTILEVERS AND EVANESCENT COUPLING

This patent application claims the benefit of priority from U.S. Provisional applications No. 60/236,667 filed Sep. 29, 2000 the entire content of which is incorporated herein by reference.

FIELD OF THE INVENTION

The invention relates to optical switches and in particular to an optical switch including a movable waveguide that is selectively evanescently coupled to a fixed waveguide by moving a micromechanical cantilever structure.

BACKGROUND OF THE INVENTION

In multi-channel communication systems, it is desirable to provide a selective coupling mechanism. This allows signal channels to be added to lines and dropped from lines or switched from line to line. It may also be desirable to provide for the splitting of a signal channel among multiple lines. To realize a large communications network, it may be desirable to provide arrays of such switches and signal splitters and numerous separate communications lines for the various channels. Desirably these arrays may be packaged together as an integrated multiplexer/demultiplexer device, which is compact, has low loss characteristics, and creates little cross talk between channels.

Additionally, a multi-channel communication network desirably contains a plurality of controllable switching means to allow rerouting of data signals within the network. This allows the flow of signal channels to be interactively altered during operation.

It may be desirable for the functions of the switches and signal splitters to be combined with controllable switching functions. This situation may be accomplished through the use of controllable switches. An array of such controllable switches may be seen as a simple, rapid reconfigurable integrated multiplexer/demultiplexer device. Such a device may allow the data flow patterns within a communications network to be almost instantaneously rerouted.

Fiber optics communication systems provide a method of streamlining the communications lines. A single optical fiber can carry a large number of separate communication channels, each channel operating bidirectionally at a different wavelength. The larger the number of wavelengths that may operate simultaneously within a fiber, the greater the capacity of the fiber.

Several factors determine what the maximum number of wavelengths operating in a single fiber can be. The first factor is the spectral range over which the fiber has a low enough loss and a high enough confinement factor to make transmission practical. The second factor is the spectral width of the laser sources used for the communications system and how much these spectra are broadened during transmission through the system. A third factor is the precision with which the channels may be separated from one another.

Providing a compact, highly discriminating, low loss multiplexing system for multi-wavelength optical communication systems has been very challenging. Some approaches that have been tried include; dynamically configurable gratings, prisms, or filters. While these means are perfectly adequate for many multiplexing systems, they suffer the drawback that the number of channels that the system may handle is limited because the wavelength dispersion of the demultiplexing means is not adequate to separate very closely spaced channels in devices of reasonable dimensions. Additionally, these approaches are not easily amenable to miniaturization.

Other wavelength multiplexers have been described in the literature. For example, frequency selective coupling means, i.e., evanescent couplers, have been proposed as an alternative to means that rely on dispersive properties of the multiplexer components. An evanescent coupler, in its simplest embodiment, uses at least two optical waveguides in such close proximity that the propagating mode of the second waveguide is within the exponentially decaying evanescent portion of the propagating mode of the first waveguide. The overlap couples optical energy into the second waveguide if the propagation constants, k, in the two guides are equal. If the values of k are equal at only a single frequency, only energy at that frequency is coupled while energy at other frequencies remains in the first guide. H. F. Taylor describes such a frequency selective coupling scheme in *Optics Communications*, 8, pp. 421–425, August 1973. The couplers described used optical coupling between two non-identical waveguides to couple the single optical frequency for which the propagation constants in the two guides are equal. The systems described in this text, however, are not readily controllable.

SUMMARY OF THE INVENTION

The present invention is embodied in a micromechanical optical switch structure that may be integrated to form an array of optical switches. The switch switches light between a main waveguide and a switched waveguide. The switched waveguide has a coupling portion and two flexible portions and is coupled to a movable cantilever arm. The cantilever arm is configured to move at least the coupling portion of the switched waveguide between at least first and second positions with respect to the main waveguide. In the first position, the switched waveguide is evanescently coupled to the main waveguide and in the second position, the switched waveguide is not evanescently coupled to the main waveguide.

DETAILED DESCRIPTION OF THE INVENTION

Figure 1:
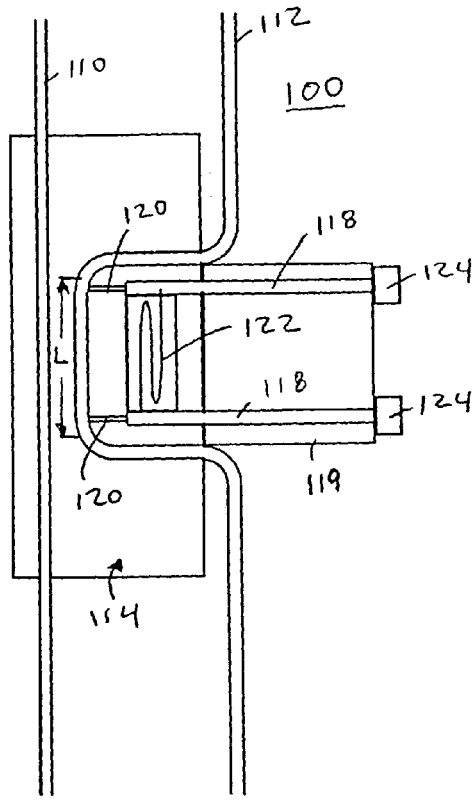
FIG. 1 is a top-plan view of an optical switch according to the present invention.

FIG. 1 shows a top-plan view of a switch 100 according to the present invention. The exemplary switch 100 includes waveguide 112 that is coupled to a movable cantilever 119 by one or more tethers 120. In the exemplary embodiments of the invention described below, the cantilever 119 is bent in its rest position and the switched waveguide 112 is away from the main waveguide 110. This position is referred to as the decoupled position. When the cantilever 119 is actuated, the switched waveguide 112 is moved proximate to the main waveguide 110 and light propagating through one of the waveguides is evanescently coupled into the other waveguide. This position is referred to as the coupled position.

The exemplary embodiment shown in FIG. 1 includes a pair of bimaterial arms 118 formed, for example, by an underlying layer of silicon carbide and a top layer of gold. The bimaterial arm used in the exemplary embodiment of the invention has a length of approximately 50 microns. The gold-silicon carbide bimaterial combination has a movement of 0.025 microns per degree Celsius. This formulation for the bimaterial arm 118 is exemplary. The bimaterial arm may be made of any two materials having thermal coefficients of expansion (TCEs) that differ sufficiently to produce movement greater than 0.005 microns per degree Celsius for a 50 micron cantilever.

As described below, the bimaterial arm may be eliminated entirely if an alternative method of actuating the switch—for example, electrostatic attraction or the piezoelectric effect—is used to move the arm instead of bimaterial bending. Alternatively, the bimaterial arms 118 may be used with the alternative method of actuating the switch, for example, to position the switched waveguide 112 away from the main waveguide 100 when the switch is in the open position. Furthermore, although the exemplary embodiments described below show the switch having two bimaterial arms, it is contemplated that an effective switch may be implemented having only one bimaterial arm or having more than two bimaterial arms.

In the exemplary embodiment of the invention, the bimaterial arms 118 are actuated by a heating element 122 that is formed on the cantilever 119. In the exemplary embodiment, the heating element, which may be, for example, a meandering strip of TiW or other conductive material, is coupled to receive electrical current from the gold layer of the bimaterial arms 118. These arms 118 connect to circuitry that selectively applies current to bend or straighten the arms via contact points 124.

Alternatively, it is contemplated that the heating element may be formed as a closed resonant element (not shown) and current may be applied to the heating element using a radio-frequency (RF) source (not shown) formed in control circuitry that is implemented in an integrated circuit upon which the optical switch array is built.

In the exemplary embodiment, the TiW used for the interconnecting traces is approximately 200 Angstroms thick and approximately 3 microns wide. The TiW used for the heating element may also be approximately 200 Angstroms thick but only approximately 0.5 microns wide. The switch may also employ a thin layer of TiW between the silicon carbide and gold layers of the bimaterial arms 118 to bind the gold to the silicon carbide.

Figure 1A:
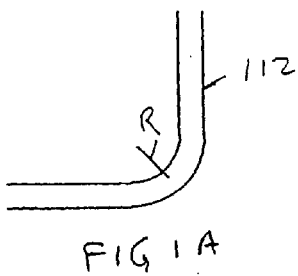
FIG. 1A is a detail of one of the bends in the optical fiber of the optical switch shown in FIG. 1

The switched waveguides 112 are bent, as shown in FIGS. 1 and 1A to make the them flexible so that they may be moved in an arc away from and toward the main waveguides 110 with minimal force. This bend, however, may cause some losses in the light propagated through the switched waveguides. These losses are determined, at least in part, by the radius of curvature of the four bends that give the switched wave guide its "U" shape in the vicinity of the switch. As shown in FIG. 1, the switched waveguide 112 is bent around the cantilever 119 at four places. Each of these bends has a radius of curvature R, as shown in FIG. 1A. This radius affects the ability of the waveguide 112 to transmit light as well as the size of the optical switch. Accordingly, the radius for a particular application is selected based on acceptable losses in the switched optical fibers and the desired size of the optical switch array. The losses in the waveguide 112 are also affected by the index of refraction of the waveguide material, a higher index of refraction results in less lost light for a given bend in the waveguide. Accordingly, the radius of curvature R of the switched waveguide 112 may also be affected by the selection of the waveguide material. Although the four bends are shown as having the same radius of curvature, it is contemplated that different radii may be used for the different bends.

Figure 3:
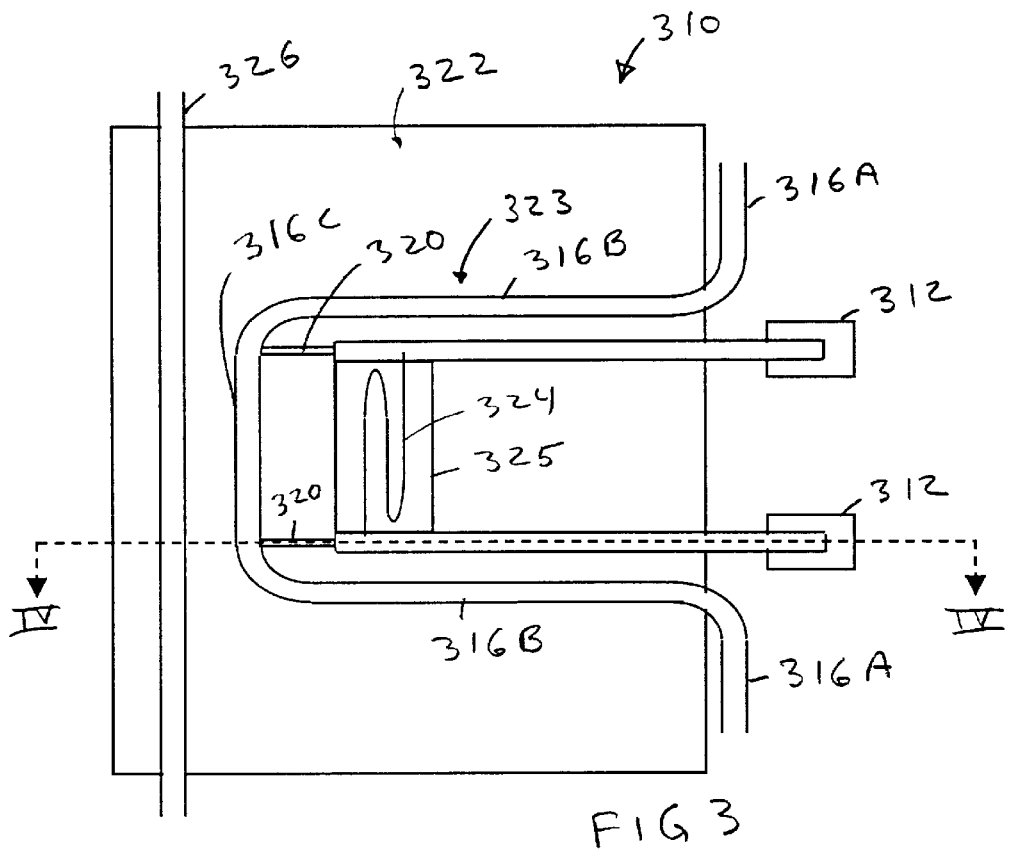
FIG. 3 is a top-plan view of an optical switch according to the present invention showing the location of the cut-away view of FIGS. 4 and 5A through 5H.

In the exemplary embodiment of the invention, both the main waveguide 110 and the switched waveguide 112 are formed, for example, from silicon nitride and have a width and height that may range between 3 microns and 0.3 microns. The tethers 120 that connect the switched waveguide 112 to the bimaterial arms 118 may be formed from one of the materials that form the bimaterial arms, for example, silicon carbide. The bimaterial arms are attached to a support layer formed on a layer of a dielectric material such as silicon dioxide or alumina which, in turn, is formed on a layer of aluminum on top of a layer of silicon dioxide that is formed over CMOS circuits located in a silicon substrate. The main waveguide, the switched waveguide and the bimaterial arm are formed on a layer of silicon dioxide which, in a region 114, in the vicinity of the switch, is used as a release layer that is selectively removed to float the waveguides and the cantilever arm above the alumina layer in the area occupied by the switch. When the release layer is removed, the main waveguide 110 is suspended above the support layer and the bimaterial arm bends, as shown in FIG. 3, pulling the switched waveguide 112 away from the main waveguide. Thus, in the region 114, the main waveguide 110 is unsupported and the switched waveguide 112 is supported by the cantilever 119.

Although the exemplary embodiment of the invention shown in FIG. 1 uses a normally open switch configuration in which bimaterial arm 118 that is bent in its rest position and is actuated to straighten, placing the switched waveguide 112 proximate to the main waveguide 110, it is contemplated that the switch may also be implemented in a normally closed configuration in which the bimaterial arms 118 may be straight in their rest positions and be bent in their actuated positions. It is also contemplated that a switch array may include a combination of normally open and normally closed switches.

The exemplary waveguides 110 and 112 are described as being formed from silicon nitride. It is contemplated, however, that they may be formed from other materials such as amorphous silicon, hydrogenated silicon, silicon dioxide or silicon carbide. If a barrier layer having a significantly different index of refraction, is deposited between the waveguides and the support layer, the support layer may also be made from the same material.

In the exemplary embodiment of the invention, the waveguides are deposited using a low temperature process that results in the formation of amorphous materials. If silicon carbide is used as a waveguide material, the tethers 120 that couple the switched waveguide to the cantilever arm should not also be made from silicon carbide. Similarly, if the waveguides are formed from silicon dioxide, the release material upon which the cantilever is built should not be silicon dioxide.

Figure 2:
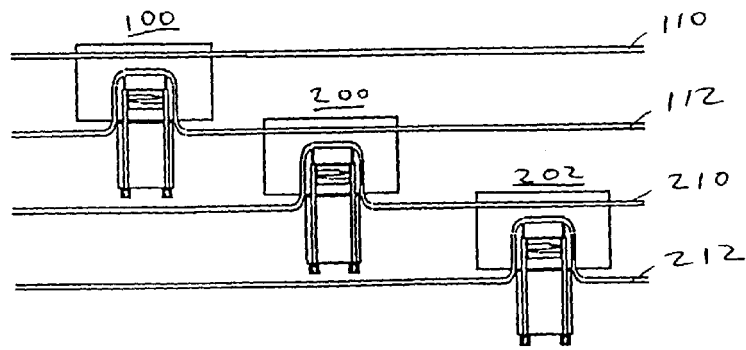
FIG. 2 is a top-plan view of an array of three optical switches such as that shown in FIG. 1.

FIG. 2 shows a portion of an exemplary array of optical switches. This example includes four waveguides 110, 112, 210 and 212. Three of these waveguides, 112, 210 and 212 are coupled to respective optical switches, 100, 200 and 202. Each switch couples its respective switched waveguide to another one of the waveguides via an evanescent field that surrounds the main waveguide. When the switched waveguide 112 is placed in close proximity to the main waveguide 110 light signals propagating through the main waveguide 110 are coupled to the switched waveguide 112 via the evanescent field. In the same way, when the switch 200 is activated, the switched waveguide 210 is evanescently coupled to the waveguide 112. Switch 202 couples the waveguide 212 to the waveguide 210 in the same way.

The length of the coupling region between the switched waveguide and the main waveguide is determined by the wavelength of the light propagated through the waveguides. The coupling between the switched waveguide 112 and the main waveguide 110 is determined by the distance between the two waveguides, the length of the length, L, of the coupling portion and the propagation constant of the waveguide. In addition, although the switch is a broad-band device, the coupling between the two waveguides depends on the wavelength of the light that is transmitted through the waveguides.

FIG. 3 is a top plan view of an alternative optical switch. The exemplary switch shown in FIG. 3 has the same structure as the switch shown in FIGS. 1 and 2 but has a larger release area 322 to reduce the stress on the switched waveguide 316. The exemplary optical switch includes a main waveguide 326, the switched waveguide 316, coupled to a cantilever arm 323 by two tethers 320. The cantilever arm 323 is anchored to the substrate 324 by two bimaterial arms 318 and includes a heating element 324 and an optional electrostatic plate 325. Electrical contact for the heating element 324 and electrostatic plate 325 is made to underlying control circuitry (not shown) through vias 312 at the respective ends of the bimaterial arms 318. It is contemplated that, instead of using materials that have different TCEs to form the bimaterial arm, one of the materials may be a piezoelectric material that changes shape in response to an electric potential. This may be implemented, for example by forming conductive traces above and below the piezoelectric material and applying different potentials to the two materials. In the exemplary embodiment described below, for example, one of the bimaterial elements is gold, a good conductor, and a conductive trace of TiW is formed over the other bimaterial element—a piezoelectric material—to form electrical connections for the heating element. These layers may be used, instead, to apply an actuating potential to the piezoelectric material.

The switched waveguide 316 includes three regions, an attached region 316A, a flexible region 316B and a coupling region 316C. The attached region 316A is physically coupled to the substrate 324. The flexible region 316B extends in roughly the same direction as the bimaterial arms 318 and is suspended over the release area 322 so that it may bend when the bimaterial arms bend. The coupling region 316C is substantially parallel to the main waveguide 326. Although the flexible portion 316B of the switched waveguide is shown as being parallel to the bimaterial arms, it is contemplated that it may be formed at an angle with respect to the bimaterial arms. This construct may be used, for example, to allow a relatively large radius of curvature for the bends in the switched waveguide 318 and, at the same time, increase the flexibility of the region 316B.

Figure 4:
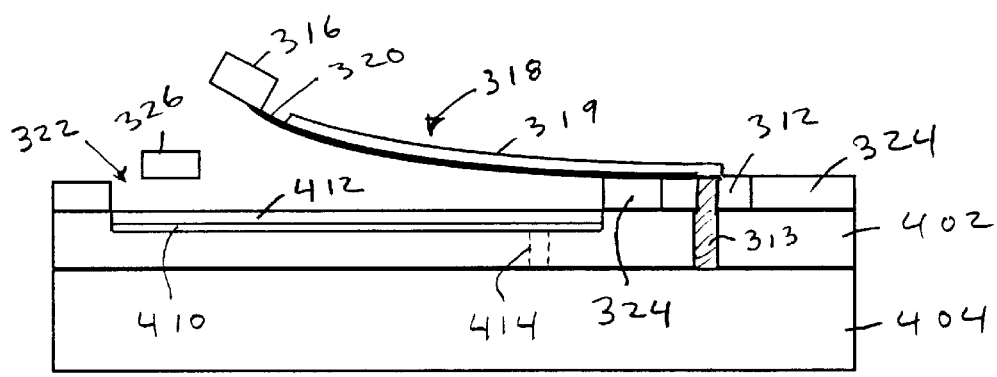
FIG. 4 is a cut-away view of the optical switch shown in FIG. 3 which is useful for describing the structure of the switch.

FIG. 4 is a cut-away side plan view of the switch shown in FIG. 3, taken along the line IV—IV. This view shows the main waveguide 326 suspended in the release area 322. FIG. 4 also shows the silicon carbide layer 320 and gold layer 319 of the bimaterial arm 318. In addition, FIG. 4 shows the via 312 and 313 connecting the gold layer 319 of the bimaterial arm to the underlying control circuitry 404 through a thick dielectric layer 402. In the exemplary embodiment of the invention, the dielectric layer 402 is silicon dioxide.

At the bottom of the release area 322, is a layer 410 of a reflective material, for example, aluminum, covered by a layer 412 of a material (e.g. alumina) that is resistant to the release agent. In the exemplary embodiment of the invention, the layer 410 covers the entire release area 322 and acts to reflect any infrared radiation that may be generated by the heating element 324 to prevent undesirable heat absorption by the layers 402 and 404. In the exemplary embodiment of the invention, the optical switch 310 is operated in a near vacuum and the silicon carbide portion 119 of the bimaterial arms act to insulate the substrate from heat generated by the heating element, so radiant heating is the main method by which the heat is exchanged. Because the temperature of the device determines the amount of bend in the bimaterial arms, it is important to carefully control the heat.

One method to make the device somewhat temperature independent is to use rely on heat or a piezoelectric potential to bend the bimaterial arm but use another method to straighten the bent arm. One method that may be used is electrostatic attraction. In the exemplary embodiment of the invention, electrostatic attraction of the cantilever arm 323 to the aluminum plate 410 is used to straighten the arm. In this embodiment, an optional via 414 couples the aluminum plate 410 to the underlying control circuitry 404. The electrostatic plate 325 is electrically connected to only one of the bimaterial arms 318 so it does not interfere with the operation of the heating element 324. In this configuration, heat is selectively applied to the switch elements to achieve a predetermined level of decoupling between the respective switched waveguides 316 and main waveguides 326. When a particular optical switch is to be closed, using the vias 312 and 414, a suitable electrostatic potential is established between the electrostatic plate 325 on the cantilever arm 323 and the layer 410 on the substrate. This potential attracts the cantilever toward the substrate, bringing the switched waveguide 316 into close proximity with the main waveguide 326.

Figure 5A:
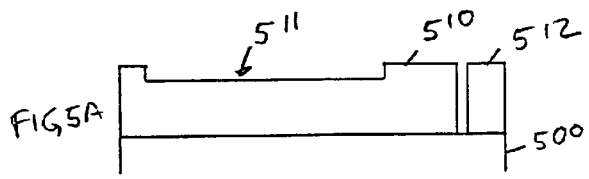
FIGS. 5A through 5H are cut-away views of an optical switch according to the present invention at various points in its formation.
Figure 5B:
Figure 5H:
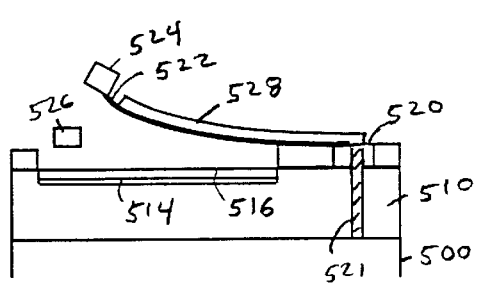
Figure 5C:
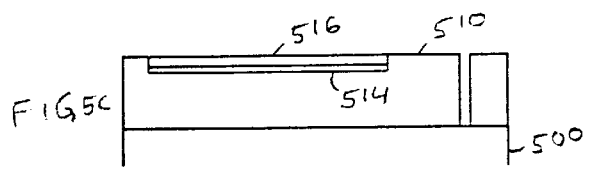
Figure 5D:
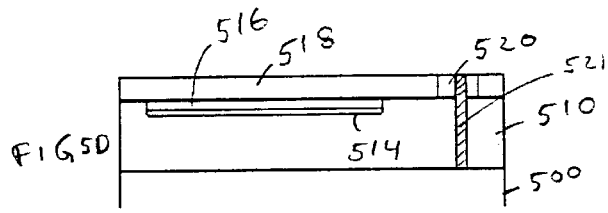
Figure 5E:
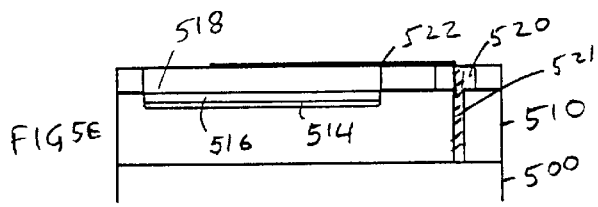
Figure 5F:
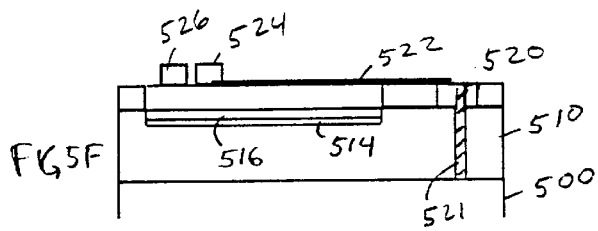
Figure 5G:
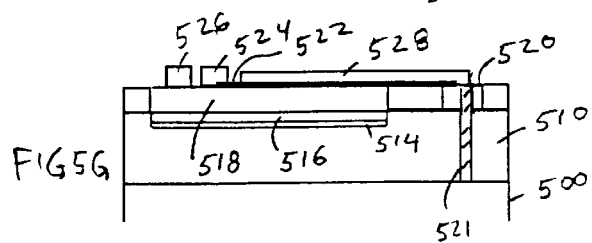

FIGS. 5A through 5H are cut-away side plan views, along the line IV—IV shown in FIG. 3, which are useful for describing an exemplary method for making the optical switch. In FIG. 5A, an oxide layer 510 is formed over the control circuitry on the substrate 500, vias 512 are formed in the oxide layer and a recessed area 511 is formed in the oxide layer 510. In the exemplary embodiment of the invention, this recessed area is substantially coextensive with the release area 322, described above with reference to FIGS. 3 and 4. Next, as shown in FIG. 5B, a reflective layer 514 is deposited in the recessed area 511. In the exemplary embodiment of the invention, this layer is aluminum. In FIG. 5C, the reflective layer is covered by a material such as alumina that is resistant to the release agent that is used to release the cantilever, as described below with reference to FIG. 5H.

In step 5D, a layer 518 of a dielectric release material, for example, silicon dioxide, is formed over the surface of the switch. A connector region 520 is patterned and formed in the oxide layer, establishing an electrical connection to the control circuitry in the substrate 500. In the exemplary embodiment of the invention, the connector region 520 may be formed from silicon carbide and filled with a metal, forming via 521, for example, TiW. Next, at step 5E, the bottom layer 522 of the bimaterial arms is formed. In the exemplary embodiment of the invention, this layer is formed from silicon carbide and also serves as the tether that connects the switched waveguide 524 to the cantilever arm.

The main waveguide 526 and switched waveguide 524 are formed at step 5F. As described above, in the exemplary embodiment of the invention, these waveguides are formed from silicon nitride. It is contemplated, however, that other materials such as amorphous silicon, hydrogenated silicon, silicon carbide or silicon dioxide may be used. The waveguides 526 and 524 are formed in their coupled position and, so, are desirably separated by a distance that is compatible with evanescent coupling between the waveguides. The tether that couples the switched waveguide to the cantilever arm is connected to the waveguide 524 over the minimum area needed to ensure physical contact sufficient to hold the waveguide on the cantilever arm when the arm is bent. This constraint minimizes any interference in signals propagated through the waveguide that may be caused by the junction between the tether material 522 and the waveguide 524.

Next, at step 5G, the upper layer 528 of the bimaterial arm, the electrostatic plate (not shown) and the heating element (not shown) are formed. In the exemplary embodiment of the invention, the upper layer 528 of the bimaterial arm may be formed from gold. It is contemplated, however, that other materials may be used as long as they are resistant to the release agent and exhibit a TCE that is sufficiently different from the TCE of the bottom layer 522 of the bimaterial arm.

In the exemplary embodiment of the invention, the electrostatic plate may be formed from the same material as the upper layer of the bimaterial arm but may be coupled to only one of the bimaterial arms that are used to support the cantilever. A layer of a dielectric material is formed over the electrostatic plate and a heating element (not shown), made for example, from TiW may be formed over the dielectric layer. It is noted that, in FIG. 5G, the gold layer 528 extends beyond the silicon carbide layer 522 in order to make electrical contact with the vias 521. If TiW is used for the conductive traces on the bimaterial arms, it would extend beyond the end of the bimaterial arms to make contact with the vias 521.

FIG. 5H illustrates the last step in the process, the release of the cantilever arm. This step is accomplished by patterning the surface of the device and applying a release agent such as HF selectively to the release area. The release agent is then flushed when the silicon dioxide beneath the cantilever arm and the main waveguide has been removed.

Referring to FIG. 3, In normal operation, the switch 310 is open because the bimaterial arms 318 hold the switched waveguide 316 away from the main waveguide 326. To close the switch, a small current, is applied to the heating element 324, generating, for example 5 to 10 microwatts of power. This small current heats the bimaterial arms 318, causing them to uncurl and move the switched waveguide 316 into close proximity with the main waveguide 326. Evanescent coupling then transfers light from the main waveguide to the switched waveguide.

The expected time constant for closing the switch is approximately ten microseconds. This time may be increased or reduced by adjusting other parameters of the switch, for example, the amount of power applied to the heating element 324, the thickness of the bimaterial arms 318 and the elements used to form the bimaterial arm 318.

Although the device shown in FIGS. 1–5H has a switched waveguide that is beside the main waveguide when the switch is closed, it is contemplated that the switched waveguide may be on top of the main waveguide. In addition, while the switched waveguide 316 is shown as being on top of the tether 320 in FIG. 4, it is contemplated that the tether 320 may connect to the top surface of the switched waveguide.

In the exemplary embodiment, light propagating in one of the main waveguides 326 and the switched waveguide 316 is evanescently coupled into the other waveguide. The degree of coupling depends, at last in part, on the separation between the main waveguide 326 and the switched waveguide 316. This separation may be monitored and controlled using a feedback mechanism implemented by a photodiode (not shown) in the control circuitry that is coupled to receive light from the switched waveguide 316. Using this feedback mechanism, the light propagation through the switched waveguide may be controlled by controlling the heat applied to the bimaterial arm.

Although the switch 310 is described as operating as an optical splitter, it is contemplated that it may be operated as a switch to scatter light that is propagating through the main waveguide when the switched waveguide 316 is placed sufficiently close to the main waveguide 326 to evanescently couple and scatter all of the light being transmitted through the main waveguide 326.

The invention has been described in terms of several exemplary embodiments. It is contemplated that it may be practiced however with modifications within the scope of the following claims.

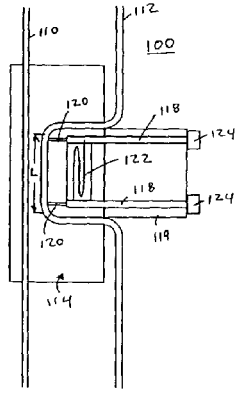

What is claimed is:

1. A micromechanical optical switch comprising:
   a main waveguide;
   a switched waveguide having a coupling portion and two flexible portions;
   a movable cantilever arm coupled to the switched waveguide and configured to move at least the coupling portion of the switched waveguide between first and second positions with respect to the main waveguide, wherein the switched waveguide is substantially evanescently coupled to the main waveguide in the first position and is not substantially evanescently coupled to the main waveguide in the second position.

2. A micromechanical optical switch according to claim 1, wherein the movable cantilever arm includes at least one bimaterial arm formed from at least two materials having a physical characteristic that differs between the two materials, wherein a stimulus applied to the bimaterial arm that affects the physical characteristic, causes the bimaterial arm to bend, moving the cantilever arm between the first and second positions.

3. A micromechanical optical switch according to claim 2, wherein the physical characteristic is thermal coefficient of expansion and the switch further includes a heating element, coupled to the bimaterial arm for applying heat to the two materials to cause the bimaterial arm to bend.

4. A micromechanical optical switch according to claim 3, wherein the switch is formed on a dielectric layer covering an integrated circuit substrate, and the switch further includes at least one via extending through the dielectric layer for applying electric current to the heating element.

5. A micromechanical optical switch according to claim 3, wherein the at least two materials include silicon carbide and gold.

6. A micromechanical optical switch according to claim 3, wherein a portion of the main waveguide, at least the coupling portion and the flexible portion of the switched waveguide and the cantilever arm are suspended in a release area, having a bottom surface, and the micromechanical optical switch further includes a reflective surface formed on the bottom of the release area to reflect any radiation generated by the heating element away from the bottom surface of the release area.

7. A micromechanical optical switch according to claim 6, wherein the reflective surface includes a layer of aluminum covered by a layer of alumina.

8. A micromechanical optical switch according to claim 1, wherein the main waveguide and the switched waveguide are formed from a material selected from the group consisting of silicon nitride, hydrogenated silicon, amorphous silicon, silicon carbide and silicon dioxide.

9. A micromechanical optical switch according to claim 1, wherein:

The cantilever arm is formed on a dielectric layer covering an integrated circuit substrate;

the movable cantilever arm further includes an electrostatic plate; and the micromechanical optical switch further includes a conductive layer formed in the dielectric layer and positioned beneath the cantilever arm and at least one electrical via extending through the dielectric layer for applying an electric potential to at least one of the electrostatic plate and the conductive layer to cause the cantilever arm to move between the first and second positions.

10. A micromechanical optical switch according to claim 9, wherein the movable cantilever arm includes at least one bimaterial arm formed from at least two materials having a physical characteristic that differs between the two materials, wherein a stimulus applied to the bimaterial arm that affects the physical characteristic causes the bimaterial arm to bend, moving the cantilever arm.

11. A micromechanical optical switch according to claim 10, wherein the physical characteristic is thermal coefficient of expansion and the switch further includes a heating element, coupled to the bimaterial arm for applying heat to the two materials to cause the bimaterial arm to bend.

12. A micromechanical optical switch according to claim 11, wherein the switch is formed on a dielectric layer covering an integrated circuit substrate, and the switch further includes at least one via extending through the dielectric layer for applying electric current to the heating element.

13. A micromechanical optical switch according to claim 11, wherein the at least two materials include silicon carbide and gold.

14. A micromechanical optical switch according to claim 11, wherein a portion of the main waveguide, at least the coupling portion and the flexible portion of the switched waveguide and the cantilever arm are suspended in a release area, having a bottom surface, and the micromechanical optical switch further includes a reflective surface formed on the bottom of the release area to reflect any radiation generated by the heating element away from the bottom surface of the release area.

15. A micromechanical optical switch according to claim 14, wherein the reflective surface is identical to the conductive surface and includes a layer of aluminum covered by a layer of alumina.

16. A micromechanical optical switching system comprising:

a plurality of switched waveguides, each having at least a coupling portion and a flexible portion, the plurality of switched waveguides being arranged adjacent to each other and in parallel;

a plurality of movable cantilever arms coupled, respectively to the plurality of switched waveguides and configured to move at least the coupling portion of the switched waveguide between first and second positions with respect to the adjacent one of the switched waveguides, wherein the switched waveguide is substantially evanescently coupled to the adjacent one of the switched waveguides in the first position and is not substantially evanescently coupled to the adjacent one of the switched waveguides in the second position.

17. A micromechanical optical switching system according to claim 16, wherein each of the movable cantilever arms includes at least one bimaterial arm formed from at least two materials having a physical characteristic that differs between the two materials, wherein a stimulus applied to the bimaterial arm that affects the physical characteristic causes the bimaterial arm to bend, moving the cantilever arm.

18. A micromechanical optical switch according to claim 17, wherein the physical characteristic is thermal coefficient of expansion and the switch further includes a heating element, coupled to the bimaterial arm for applying heat to the two materials to cause the bimaterial arm to bend.

19. A micromechanical optical switch according to claim 18, wherein the switch is formed on a dielectric layer covering an integrated circuit substrate, and the switch further includes at least one via extending through the dielectric layer for applying electric current to the heating element.

* * * * *

UNITED STATES PATENT AND TRADEMARK OFFICE
CERTIFICATE OF CORRECTION

PATENT NO. : 6,658,176 B2
DATED : December 2, 2003
INVENTOR(S) : Robert Amantea

It is certified that error appears in the above-identified patent and that said Letters Patent is hereby corrected as shown below:

Delete the title page and insert the attached title page.

Delete Sheet 1 of 3, and insert the new attached Sheet 1 of 3.

Title page,
Fig. 1, "116" should read -- 119 --

Signed and Sealed this

Fifth Day of October, 2004

JON W. DUDAS
*Director of the United States Patent and Trademark Office*

(12) United States Patent
Amantea

(10) Patent No.: US 6,658,176 B2
(45) Date of Patent: Dec. 2, 2003

(54) OPTICAL SWITCH USING MOVABLE MICROMECHANICAL CANTILEVERS AND EVANESCENT COUPLING

(75) Inventor: Robert Amantea, Manalapan, NJ (US)

(73) Assignee: Sarnoff Corporation, Princeton, NJ (US)

( * ) Notice: Subject to any disclaimer, the term of this patent is extended or adjusted under 35 U.S.C. 154(b) by 267 days.

(21) Appl. No.: 09/928,757

(22) Filed: Aug. 13, 2001

(65) Prior Publication Data

US 2002/0039467 A1 Apr. 4, 2002

Related U.S. Application Data

(60) Provisional application No. 60/236,667, filed on Sep. 29, 2000.

(51) Int. Cl.[7] ................................................ G02B 6/26
(52) U.S. Cl. .......................... 385/16; 385/15; 385/25; 385/27; 385/30; 385/31; 385/42; 385/32; 385/14; 385/48
(58) Field of Search .............................. 385/15, 16, 17, 385/18, 24, 27, 32, 39, 42, 31, 25, 14, 48

(56) References Cited

U.S. PATENT DOCUMENTS

| | | | |
|---|---|---|---|
| 4,023,887 A | | 5/1977 | Speers ..................... 385/16 X |
| 4,428,017 A | | 1/1984 | Vaerewyck et al. ............ 361/31 |
| 4,521,683 A | | 6/1985 | Miller ....................... 73/705 X |
| 4,560,234 A | * | 12/1985 | Shaw et al. ..................... 385/16 |
| 4,592,043 A | * | 5/1986 | Williams ....................... 398/79 |
| 4,648,686 A | | 3/1987 | Segawa ..................... 385/16 X |
| 4,723,827 A | * | 2/1988 | Shaw et al. ..................... 385/25 |
| 4,832,466 A | | 5/1989 | Nishimura et al. .......... 350/354 |
| 5,056,885 A | * | 10/1991 | Chinn .......................... 385/13 |
| 5,173,956 A | | 12/1992 | Hayes .......................... 385/16 |
| 5,261,015 A | | 11/1993 | Glasheen ...................... 385/23 |
| 5,418,868 A | | 5/1995 | Cohen et al. .................. 385/16 |
| 5,623,566 A | | 4/1997 | Lee et al. ...................... 385/24 |
| 5,640,471 A | | 6/1997 | Khan et al. .................... 385/17 |
| 5,784,505 A | | 7/1998 | Schunk ......................... 385/17 |
| 6,097,530 A | | 8/2000 | Asher et al. ................. 359/288 |
| 6,122,416 A | | 9/2000 | Ooba et al. .................... 385/16 |

OTHER PUBLICATIONS

Braun et. al., "Wavelength Selective Optical Add/Drop Multiplexer . . . " U.S. Pub. No. U.S. 2002/0039470A1, published Apr. 4, 2002.*
Amantea, "Optical Switch Using Movable Micromechanical . . . ", U.S. Pub. No. U.S. 2002/0039467A1, published Apr. 4, 2002.*

* cited by examiner

*Primary Examiner*—Brian Healy
(74) *Attorney, Agent, or Firm*—William J. Burke

(57) ABSTRACT

A micromechanical optical switch structure, that may be integrated to form an array of optical switches, switches light between a main waveguide and a switched waveguide. The switched waveguide has a coupling portion and two flexible portions and is coupled to a movable cantilever arm. The cantilever arm is configured to move at least the coupling portion of the switched waveguide between first and second positions with respect to the main waveguide. In the first position, the switched waveguide is evanescently coupled to the main waveguide and in the second position, the switched waveguide is not evanescently coupled to the main waveguide. The movable cantilever arm may be formed with bimaterial arms that move the switched waveguide in response to heat or a piezoelectric potential being applied to the arm or they may be formed with an electrostatic plate that moves the arms in response to an electrostatic potential.

19 Claims, 3 Drawing Sheets